United States Patent [19]

Büran et al.

[11] Patent Number: 4,592,964

[45] Date of Patent: Jun. 3, 1986

[54] WEAR-RESISTANT COATING

[75] Inventors: Ulrich Büran, Burscheid; Manfred Fischer, Leichlingen; Hans-Jochem Neuhäuser, Bergisch-Gladbach, all of Fed. Rep. of Germany

[73] Assignee: Goetze AG, Burscheid, Fed. Rep. of Germany

[21] Appl. No.: 740,299

[22] Filed: Jun. 3, 1985

[30] Foreign Application Priority Data

Jun. 9, 1984 [DE] Fed. Rep. of Germany ....... 3421569

[51] Int. Cl.$^4$ ............................................. C22C 29/00
[52] U.S. Cl. .................................... 428/610; 428/621; 428/627; 428/632
[58] Field of Search ................ 428/610, 621, 627, 632

[56] References Cited

U.S. PATENT DOCUMENTS

| | | | |
|---|---|---|---|
| 2,689,380 | 9/1954 | Tait | 428/610 |
| 3,539,192 | 11/1970 | Prasse | 428/610 |
| 3,920,412 | 11/1975 | Jones | 428/627 |
| 3,922,444 | 11/1975 | Nakamura | 428/627 |
| 4,023,252 | 5/1977 | Levinstein et al. | 428/610 |

FOREIGN PATENT DOCUMENTS

| | | | |
|---|---|---|---|
| 2357321 | 6/1977 | France | 428/627 |
| 58-5631 | 1/1977 | Japan | 428/627 |
| 2112015 | 12/1982 | United Kingdom . | |

*Primary Examiner*—Veronica O'Keefe
*Attorney, Agent, or Firm*—Spencer & Frank

[57] ABSTRACT

A sprayed-on wear-resistant coating which is carried on a substrate constituted by a machine part surface, has an inner face oriented towards the substrate and an outer face oriented away from the substrate. The coating consists of a material whose structure and/or composition continuously varies from the inner face of the coating towards the outer face thereof.

20 Claims, 2 Drawing Figures

WEAR-RESISTANT COATING

BACKGROUND OF THE INVENTION

This invention relates to a wear-resistant coating applied to machine component surfaces which are exposed to frictional wear such as, for example, the running faces of piston rings for internal combustion engines. Such coating is usually applied by a flame spraying process, preferably a plasma spraying process, with open spraying or in-chamber spraying. The wear-resistant coatings, whose primary purpose is to extend the service life of machine components which are exposed to extreme wear, are formed preferably of metal, metal/ceramic mixtures and/or pure ceramic materials. On the running faces of piston rings particularly molybdenum or molybdenum-containing layers applied by a flame spraying (plasma spraying) method have been proved advantageous. These coatings are provided either on the entire running face or in grooves in an in-chamber spraying method.

In case of extreme stresses on piston rings, occurring, for example, during a dry run in a damaged engine or in up-to-date high-rpm diesel engines, particularly turbocharged engines, ruptures may occur on the molybdenum layers as a result of overheating which may lead to a scaling or a break-off of the coating. For this reason, particularly molybdenum alloys or other alloys and ceramic materials are often used with an additive of low melting point alloys or intermetallic compounds as a binder material. Such measures, however, have achieved only partially the desired results.

Coatings on faces of machine components exposed to frictional wear must have the following properties in addition to a satisfactory and temperature-resistant adhesion to the substrate and a satisfactory and temperature-resistant cohesion of the coating material itself: the outer surface of the coating must be scorch mark-resistant and wear resistant and in such areas it should have pores for receiving lubricants. Further, in case of a dry (non-lubricated) run, the coating should exhibit a sufficient self lubricating property and also, during the run-in period its own wear should be sufficient to adapt to the frictional counter faces. Furthermore, such layers also should have a high break-off resistance and even after a long service they should exhibit only slight fatigue, if any at all. Similarly, particularly in case of in-chamber sprayed coatings, the thermal coefficient of expansion of the substrate and that of the coating material should be coordinated to prevent the generation of stresses which may also result in the breaking away of the coating. The alloy or ceramic layers developed heretofore, however, do not, in most cases, have simultaneously all the above-discussed properties. Measures such as the addition of a hard metal may improve the wear resistance of the layer, but it has led to a decrease in the adhesion of the layer to the substrate or the cohesion within the coating so that such layers did not prove to be resistant to break-off or to be insensitive to thermal shocks.

In the coating technology involving piston rings, such as applying a hard chromium layer galvanically, it is conventional to provide intermediate layers at the substrate for improving the hard chromium layer or to provide the upper surfaces with soft metal layers for improving the run-in behavior of the rings. While these measures are effective in many cases, the application of intermediate layers or the run-in surface layers requires additional process steps which render the rings more expensive. Further, because of the unsatisfactory adhesion of the individual layers to one another, damages are likely to occur during heavy duty service.

SUMMARY OF THE INVENTION

It is an object of the invention to provide an improved wear-resistant coating which is applied to machine components, particularly to the running faces of piston rings by means of a flame spraying process such as a plasma spraying process and which behaves highly satisfactorily even under extreme stresses. It is a further object to ensure a simple and inexpensive manufacture of the coatings and to permit the manufacture of the wear-resistant materials with advantageous properties adapted to the particular intended service.

This object and others to become apparent as the specification progresses, are accomplished by the invention, according to which, briefly stated, the coating has a continuously varying structure and/or composition as viewed throughout its thickness.

As concerns a continuous structural change, according to a preferred embodiment of the invention, the porosity of the wear-resistant coating continuously increases throughout the thickness of the coating, as viewed outwardly from the substrate.

As concerns a continuous change of the composition of the coating, the powder mixture to be applied in a spraying process is formed of at least two different components and the composition of the mixture is changed continuously during the spraying process.

DESCRIPTION OF THE PREFERRED EMBODIMENTS

Figure 1:
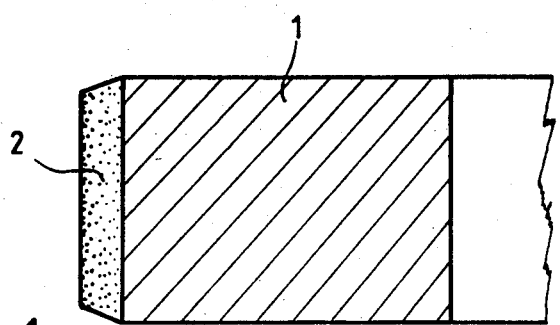
FIG. 1 is an axial sectional view of a piston ring including a preferred embodiment of the invention.

According to a preferred embodiment of the invention, the composition of the wear-resistant coating applied to the surface (substrate) of a machine component exposed to sliding friction, changes continuously throughout the thickness of the coating outwardly from the substrate, from 25% by weight molybdenum, 50% by weight molybdenum carbide (Mo$_2$C) and/or chromium carbide (Cr$_3$C$_2$) and 25% by weight binder metal to 65% by weight molybdenum, 10% by weight Mo$_2$C and/or Cr$_3$C$_2$ and 25% binder metal.

According to another preferred embodiment of the invention, the composition of the coating continuously changes throughout the thickness of the coating outwardly from the substrate, from 55% by weight aluminum oxide (Al$_2$O$_3$), 35% by weight titanium dioxide (TiO$_2$) and 10% by weight lanthanum oxide (La$_2$O$_3$) and/or niobium oxide with 20% by weight calcium carbonate to 40% by weight Al$_2$O$_3$, 25% by weight TiO$_2$ and 10% by weight La$_2$O$_3$ and/or niobium oxide with 20% by weight calcium carbonate and 25% by weight binder metal.

According to still another preferred embodiment of the invention, the composition of the coating changes throughout the thickness outwardly from the substrate, from 20% by weight molybdenum, 60% by weight ferrochromium and/or chromium and 20% by weight binder metal to 60% by weight molybdenum, 15% by weight ferrochromium and/or chromium and 25% by weight binder metal.

Prior to applying the wear-resistant coating, the substrate is, according to a further feature of the invention, provided with an adhesion-improving layer which may be preferably molybdenum and/or a nickel-chromium alloy and/or a nickel-chromium-aluminum alloy.

According to a further feature of the invention, the wear-resistant coating may further contain up to 25% by weight an intermetallic compound based on cobalt and/or nickel. According to a further feature of the invention, the coating may contain up to 25% by weight solid lubricants such as molybdenum disulfide, tungsten disulfide, boron nitride, calcium fluoride, nickel graphite and/or PTFE powder.

The invention thus provides a wear-resistant coating whose properties are optimally adapted to the stress conditions by virtue of the continuously changing composition as viewed throughout the thickness of the coating.

By virtue of the fact that the coating zone situated closest to the substrate is so selected that it ensures an optimum adhesion to the substrate, the adhesion of the entire coating to the substrate proves to be highly satisfactory even under extreme stresses while exposed to excessive heat. By using higher proportions of the wear-resistant components of the coating as well as using solid lubricants and a higher porosity in the outside-lying coating zones, the entire coating is simultaneously wear-resistant and scorch mark-resistant, it ensures a good run-in behavior and provides for a satisfactory self-lubrication in case of an emergency. By virtue of the preferably qualitatively unitary composition of the coating achieved by continuously changing composition ratios between the individual layers no adhesion problems are encountered upon applying the coating to a substrate.

The method of making the wear-resistant coating is relatively simple and inexpensive. The wear-resistant coating according to the invention may be applied with several spray guns, but preferably with a single spray gun in which the quantities of the individual components of the mixture to be applied at any given moment or period are automatically changed, for example, by electronic control means. During application of the coating, particularly in the testing stage, the technician may continuously change the quantities of the individual components according to his judgment such as to arrive relatively simply and rapidly at the optimal composition of the sprayed layers for the intended particular purpose.

Referring to FIG. 1, the piston ring 1 shown therein is provided on its peripheral axial edge face with a coating 2 whose composition changes continuously radially outwardly.

Figure 2:
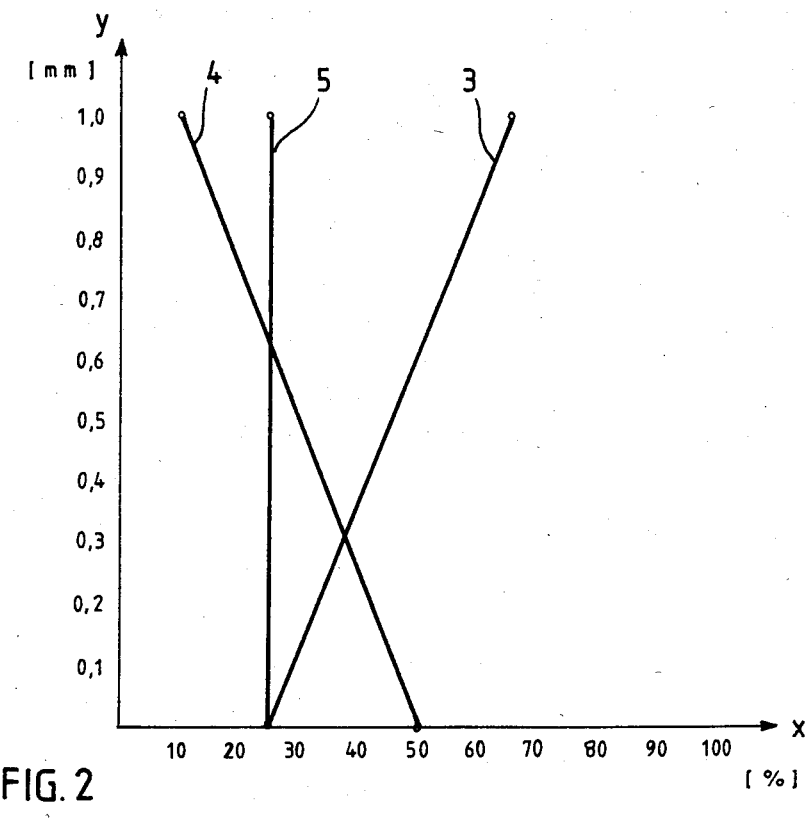
FIG. 2 is a diagrammatic illustration of the invention.

Turning to FIG. 2, in the coordinate system shown therein the Y-axis represents the thickness of the coating 2 on an enlarged scale and the abscissa represents the percent by weight of the components in the coating 2.

The starting point—that is, the boundary coating layer in contact with the substrate—is an exemplary coating composition of 25% by weight molybdenum, 50% by weight molybdenum carbide and 25% by weight binder metal which changes gradually throughout the thickness of the coating outwardly from the substrate, to eventually assume, at the outer boundary layer thereof, 65% by weight molybdenum, 10% by weight molybdenum carbide and 25% by weight binder metal.

Curve 3 illustrates the change of the molybdenum contents, curve 4 illustrates the change of the molybdenum carbide contents and curve 5 shows the change of the binder metal content in the coating 2.

The electronic equipment for continuous mixing of the spray powders is described in German Pat. No. 28 07 866.

Examples for binder metals are alloys of nickel chromium, nickel chromium aluminum, nickel aluminum, nickel chromium boron silicon and nickel or cobalt chromium aluminum yttrium.

It will be understood that the above description of the present invention is susceptible to various modifications, changes and adaptations, and the same are intended to be comprehended within the meaning and range of equivalents of the appended claims.

What is claimed is:

1. In a sprayed-on wear-resistant coating carried on a substrate constituted by a machine part surface, the coating having an inner face oriented towards the substrate and an outer face oriented away from the substrate; the improvement wherein the coating consists of a material whose structure continuously varies from said inner face towards said outer face.

2. A sprayed-on wear-resistant coating as defined in claim 1, wherein the porosity of the material continuously varies from said inner face towards said outer face.

3. A sprayed-on wear-resistant coating as defined in claim 2, wherein the porosity of the material continuously increases from said inner face towards said outer face.

4. In a sprayed-on wear-resistant coating carried on a substrate constituted by a machine part surface, the coating having an inner face oriented towards the substrate and an outer face oriented away from the substrate; the improvement wherein the coating consists of a material whose composition continuously varies from said inner face towards said outer face.

5. A sprayed-on wear-resistant coating as defined in claim 4, wherein said material consists of a mixture of at least two different components.

6. A sprayed-on wear-resistant coating as defined in claim 4, wherein said material comprises a first component consisting of an adhesion-enhancing and shatter risk-reducing alloy and a second component consisting of a highly wear-resistant alloy; said first component being dominant in said material in a thickness zone of the coating including said inner face and said second component being dominant in said material in a thickness zone of the coating including said outer face.

7. A sprayed-on wear-resistant coating as defined in claim 4, further comprising an adhesion-enhancing layer situated between said substrate and said inner face of said coating.

8. A sprayed-on wear-resistant coating as defined in claim 7, wherein said adhesion-enhancing layer comprises a material selected from a group consisting of molybdenum, a nickel-chromium alloy, a nickel aluminum alloy and a nickel-chromium-aluminum alloy.

9. A sprayed-on wear-resistant coating as defined in claim 4, wherein said material comprises molybdenum, Mo$_2$C and a binder metal; from said inner face to said outer face the molybdenum changing from 25 to 65% by weight, the Mo$_2$C changing from 50 to 10% by weight and the binder metal being unchanged at 25% by weight.

10. A sprayed-on wear-resistant coating as defined in claim 4, wherein said material comprises molybdenum, $Cr_3C_2$ and a binder metal; from said inner face to said outer face the molybdenum changing from 25 to 65% by weight, the $Cr_3C_2$ changing from 50 to 10% by weight and the binder metal being unchanged at 25% by weight.

11. A sprayed-on wear-resistant coating as defined in claim 4, wherein said material comprises molybdenum, $Mo_2C$, $Cr_3C_2$ and a binder metal; from said inner face to said outer face the molybdenum changing from 25 to 65% by weight, the $Mo_2C$ and $Cr_3C_2$ changing from a total of 50 to a total of 10% by weight and the binder metal being unchanged at 25% by weight.

12. A sprayed-on wear-resistant coating as defined in claim 4, wherein said material comprises molybdenum, ferrochromium and a binder metal; from said inner face to said outer face the molybdenum changing from 20 to 60% by weight, the ferrochromium changing from 60 to 15% by weight and the binder metal changing from 20 to 25% by weight.

13. A sprayed-on wear-resistant coating as defined in claim 4, wherein said material comprises molybdenum, chromium and a binder metal; from said inner face to said outer face the molybdenum changing from 20 to 60% by weight, the chromium changing from 60 to 15% by weight and the binder metal changing from 20 to 25% by weight.

14. A sprayed-on wear-resistant coating as defined in claim 4, wherein said material comprises molybdenum, ferrochromium, chromium and a binder metal; from said inner face to said outer face the molybdenum changing from 20 to 60% by weight, the ferrochromium and chromium changing from a total of 60 to a total of 15% by weight and the binder metal changing from 20 to 25% by weight.

15. A sprayed-on wear-resistant coating as defined in claim 4, wherein said material comprises $Al_2O_3$, $TiO_2$, $La_2O_3$, calcium carbonate and a binder metal; from said inner face to said outer face the $Al_2O_3$ changing from 55 to 40% by weight, the $TiO_2$ changing from 35 to 25% by weight, the $La_2O_3$ remaining unchanged at 10% by weight, the calcium carbonate remaining unchanged at 20% by weight and the binder metal changing from 0 to 25% by weight.

16. A sprayed-on wear-resistant coating as defined in claim 4, wherein said material comprises $Al_2O_3$, $TiO_2$, niobium oxide, calcium carbonate and a binder metal; from said inner face to said outer face the $Al_2O_3$ changing from 55 to 40% by weight, the $TiO_2$ changing from 35 to 25% by weight, the niobium oxide remaining unchanged at 10% by weight, the calcium carbonate remaining unchanged at 20% by weight and the binder metal changing from 0 to 25% by weight.

17. A sprayed-on wear-resistant coating as defined in claim 4, wherein said material comprises $Al_2O_3$, $TiO_2$, $La_2O_3$, niobium oxide, calcium carbonate and a binder metal; from said inner face to said outer face the $Al_2O_3$ changing from 55 to 40% by weight, the $TiO_2$ changing from 35 to 25% by weight, the $La_2O_3$ and niobium oxide remaining unchanged at a total of 10% by weight, the calcium carbonate remaining unchanged at 20% by weight and the binder metal changing from 0 to 25% by weight.

18. A sprayed-on wear-resistant coating as defined in claim 4, wherein said material comprises intermetallic compounds up to 25% by weight on the basis selected from the group consisting of cobalt and nickel.

19. A sprayed-on wear-resistant coating as defined in claim 4, wherein said material comprises a solid lubricant up to 25% by weight.

20. A sprayed-on wear-resistant coating as defined in claim 19, wherein said solid lubricant is selected from the group consisting of molybdenum sulfide, tungsten disulfide, boron nitride, calcium fluoride, nickel graphite and PTFE-powder.

* * * * *